June 19, 1962   C. H. NORDELL   3,039,780
SEAL FOR USE BETWEEN RELATIVELY MOVABLE MEMBERS
Filed March 21, 1955   3 Sheets-Sheet 1

Inventor
Carl H. Nordell
By Ahlberg, Nupper & Gradolph
Atty.

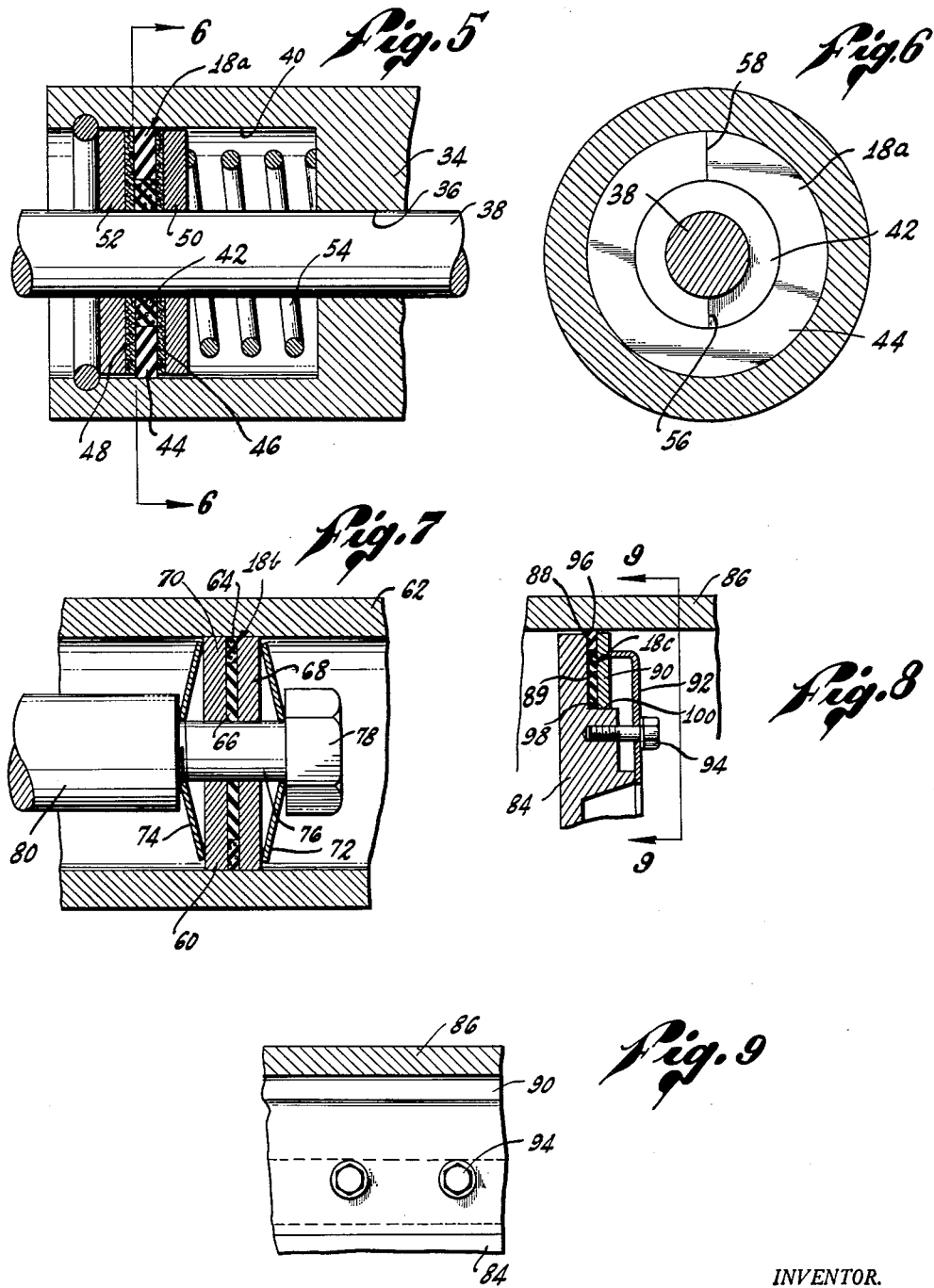

June 19, 1962     C. H. NORDELL     3,039,780
SEAL FOR USE BETWEEN RELATIVELY MOVABLE MEMBERS
Filed March 21, 1955     3 Sheets-Sheet 3
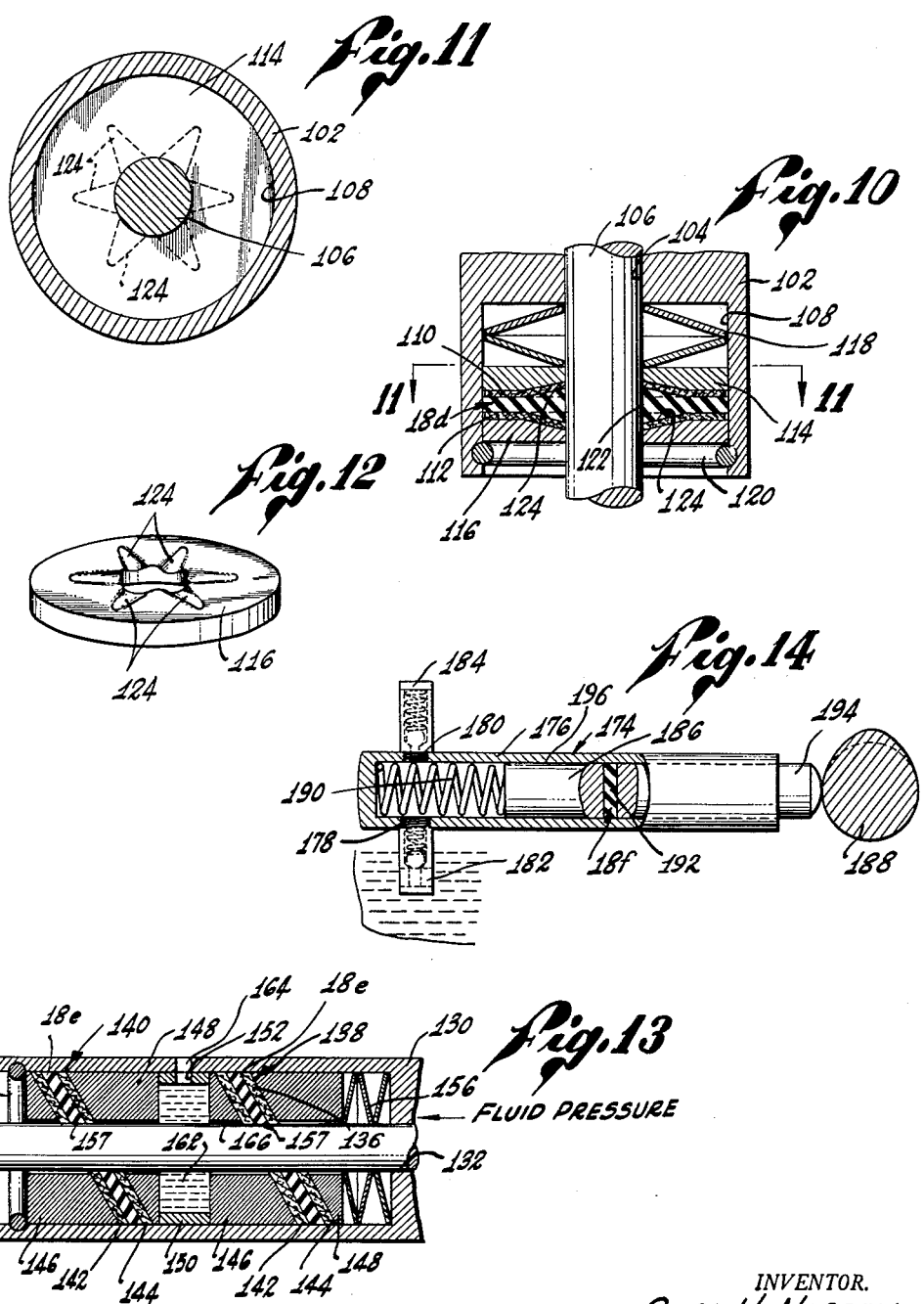
INVENTOR.
CARL H. NORDELL United States Patent Office 3,039,780
Patented June 19, 1962

3,039,780
SEAL FOR USE BETWEEN RELATIVELY
MOVABLE MEMBERS
Carl H. Nordell, Crystal Bay, Nev.
Filed Mar. 21, 1955, Ser. No. 495,616
12 Claims. (Cl. 277—125)

This invention relates to a seal for use with relatively movable members, such as an axially or rotatably movable rod or shaft used for operating some movable part such as a valve member, rotary pump, or the like, or such as a piston and a cylinder, and which is exposed to fluids which, except for the seal, may leak from the space between the relatively movable members.

Stuffing boxes and seals of many types and varities are used for this purpose and are either packed with rings or cone-like molded parts which must be slipped whole over the end of the shaft. Other sealing members are divided in halves, to enable them to be replaced readily upon the shaft without removing parts connected to the shaft. In general, the former types are more efficient and lasting and are displacing those divided forms and the older stuffing box with its wedged-in packing, even though the labor cost of demounting the shaft for their replacement, when worn, may be considerable.

It is one of the objects of this invention to provide a seal of high efficiency and long life, which may be simply and easily replaced.

Another object is to use seal parts which are easily and inexpensively stamped out of sheet material.

A further object is to produce a seal which may be well lubricated and has but little inherent frictional resistance or drag.

A further object is to provide a compact shaft seal of short length longitudially of the shaft, which may be employed in a housing which need not be precisely machined.

A further object is to provide an improved shaft seal which will inhibit fluid flow in either direction longitudinally of the shaft.

An important object is to provide a seal for sealing the space existing between two relatively movable surfaces that includes an impervious and deformable membrane capable of undergoing plastic flow, and means for applying pressure over the surface of said membrane so as to urge it into said space, the membrane being adapted to undergo plastic flow into said space at a minimum rate equal to that at which it is worn away by the relative movement of the two surfaces.

Another object is to provide a seal of the aforedescribed nature which may be utilized between two members undergoing either relative rotary or reciprocal movement.

It has been determined that certain materials, such as rubber, exhibit excellent plastic flow characteristics and yet they are not as wear-resistant as certain other materials, such as various plastics including Polyethylene or Polytetrafluorethylene. Another object of the invention is to provide a seal of the aforedescribed nature having a first portion formed of a material having high wear-resistant qualities that is disposed adjacent the moving surfaces to be sealed, and a second portion formed of a material having excellent plastic flow characteristics that encompasses (or is encompassed by) the first portion so as to transmit its pressure due to plastic flow to the edge of the first portion.

Yet another object is to provide a seal of the aforedescribed nature especially adapted for use between two relatively rotatable members and having unique means for restraining the tendency of the rotating member to twist the membrane.

These and other objects and advantages of the present invention will become apparent from the following detailed description, when taken in conjunction with the accompanying drawings, wherein:

FIGURE 5 is a central vertical sectional view of another form of shaft seal embodying the present invention;

FIGURE 6 is a vertical sectional view taken on line 6—6 of FIGURE 5;

FIGURE 7 is a central vertical sectional view of a seal which embodies the present invention and is adapted for use between a piston or plunger and a cylinder wall;

FIGURE 8 is a vertical sectional view showing another form of seal embodying the present invention;

FIGURE 9 is a vertical sectional view taken on line 9—9 of FIGURE 8;

FIGURE 10 is a central vertical sectional view showing a rotary shaft seal that embodies the present invention;

FIGURE 11 is a horizontal sectional view taken on line 11—11 of FIGURE 10;

FIGURE 12 is a perspective view showing an element of the seal of FIGURES 10 and 11;

FIGURE 13 is a central vertical sectional view showing another form of rotary shaft seal embodying the present invention; and, FIGURE 14 is a central vertical sectional view of a metering pump which incorporates another seal that embodies the present invention.

Figure 1:
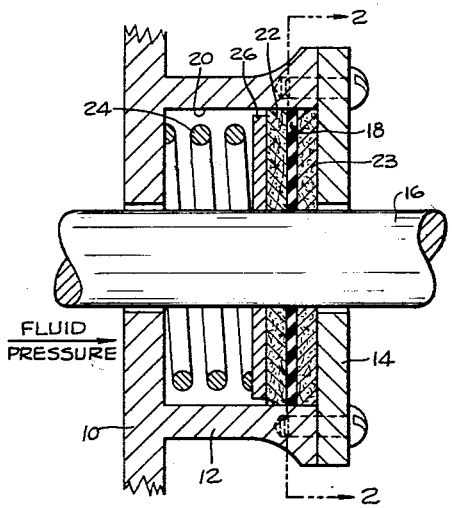
FIGURE 1 is a central vertical sectional view of a shaft seal embodying the present invention and adapted to seal a shaft against fluid flow in one direction along the length of the shaft.
Figure 2:
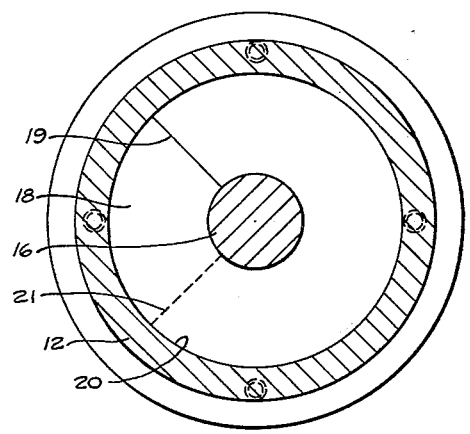
FIGURE 2 is a vertical sectional view taken on line 2—2 of FIGURE 1.

Referring to FIGURES 1 and 2, the first form of seal embodying the present invention is shown as a part of some apparatus, such as a pump, having a wall 10 provided with a housing 12 enclosing the seal. The housing 12 is in part closed by a cap plate 14. Both the wall 10 and the cap 14 are provided with holes for a shaft 16. There is preferably some clearance between the shaft 16 and the wall 10, as well as the cover plate 14, so that the shaft is free to be guided in its bearings, although in some instances either the wall 10 and plate 14, or both, may be designed to provide bearings for the shaft 16.

The main sealing element consists of a centrally apertured membrane, diaphragm or disc 18 which has a central opening originally of substantially the same diameter as the shaft 16. The outer diameter of this sealing disc is such that it fits snugly against the wall of the bore 20 in the housing 12. This diaphragm is cut from relatively soft sheet rubber or any suitable synthetic rubber substitute, or plastic, which has properties such that the diaphragm will function as hereinafter described. As shown in FIGURE 2, the diaphragm 18 preferably has a radial slit 19 so that it may be easily removed and replaced without the necessity of disconnecting any couplings or other parts which are normally secured to the shaft.

The diaphragm 18 is backed by washers 22 and 23 which are preferably of the same size as the diaphragm 18, but are somewhat thicker, and are stamped from sheet felt or similar fibrous material. Each of these washers may have a radial slit 21, preferably not in alignment with the slit 19. A coil spring 24 is compressed between the wall 10 and a metal washer 26, and thus applies a force longitudinally of the shaft tending to compress the rubber diaphragm 18 in a direction tending to cause the diaphragm to expand radially outwardly and inwardly. The coil spring 24 exerts sufficient pressure against the diaphragm 18 to hold it in initial sealing relationship with the shaft 16 and should preferably not be very much stronger than is necessary to effect this result. As increasing fluid pressure is applied to the sealing assembly, the faces of diaphragm 18 will be subjected to increasing pressure, and due to the resulting tendency of the diaphragm to expand radially inwardly and outwardly, the inner edge of the diaphragm will bear against the shaft more tightly and the peripheral edge of the diaphragm will bear more firmly against the wall of the bore 20, thus assuring a good seal irrespective of the pressure to which the sealing assembly is subjected, within reasonable limits.

Essentially, this seal consists of a housing or box around the shaft and a comparatively thin impervious diaphragm or membrane fitting snugly around the shaft and against the surrounding wall of the housing, thereby sealing off all flow. A thin membrane or diaphragm can seal off flow just as effectually as a thick one, and having but little surface contact with the moving shaft, its frictional drag will be at a minimum. The elasticity of the diaphragm 18 enables it to yield to vibration of the shaft and to conform to minor irregularities of surface or motion without permitting leakage. It is effectively supported against the fluid pressure by the bed of preferably porous resilient material, such as the dense felt washer 23 or by a number of layers of a synthetic unwoven fabric, which gives its support to the diaphragm right up to the shaft and housing. Being resilient, the washers 22 and 23 will conform to shaft vagaries almost as well as the diaphragm 18 itself, and leave so little clearance that the diaphragm will not be forced into the gap. Being porous, the washer 23 can hold a needed lubricant, for it is on the dry side of the diaphragm and being only moderately plastic, the pressure on its face, as well as on the washer 22, will not be readily transmitted sidewise to produce drag on the shaft.

The material of which the membrane or diaphragm 18 is made is both elastic and subject to slow plastic flow, and as a result the pressure of the fluid within the housing 12, acting on the inner face of the diaphragm 18, will cause the latter to tend to be deformed radially outwardly and inwardly, thus assuring increasing pressure contact between the peripheral edge of the diaphragm 18 and the bore 20 and the inner edge surface against the shaft 16. If the diaphragm is made somewhat oversize, its compression between the shaft and the wall of the bore 20 will be sufficient to insure fluid tightness in both places regardless of the amount of pressure. If spring 24 were omitted, the seal might be ineffective; as soon as the movement of the shaft wore away some of the diaphragm, the fluid pressure in the gap would prevent the fluid pressure on the face from expanding the diaphragm to close the gap. It is for this reason that the force due to the fluid pressure acting on the inner face of the diaphragm 18 is supplemented by the force of the compressed spring 24. The force of the spring is uniformly distributed against the inner face of the diaphragm 18 by the stiff metal washer 26 and the felt washer 22, because the diaphragm is backed by the felt washer 23.

As the shaft inevitably wears away the portion of the diaphragm in contact with it, the spring pressure forces the diaphragm inward and fluid tightness will be maintained for a time which is dependent upon many factors, such as speed, roughness of shaft, lubricating powers of the fluid, composition of the diaphragm, spring pressure, etc.

However, the useful life of the seal will be comparatively long, because the spring pressure will induce plastic flow to the diaphragm to replace the portion worn away, and thus a considerable portion of the mass of the diaphragm is made available to take up wear. Since the edge of the diaphragm is the area being worn away, and this is small, the mass available lasts longer than seems possible at first thought. For example, assume that a one inch diameter shaft is sealed with a three inch diaphragm one-eighth inch thick. When the diaphragm has been reduced one-thirty-second of an inch in thickness, there is still more than enough thickness left for sealing and approximately .19 cubic inch will have been displaced inwardly to make up for wear. The area of wear is the circumference of the shaft multiplied by the average thickness during the period of wear, which is $7/64$ inch, making the area of contact of the diaphragm with the shaft 0.34 square inch. The diaphragm mass of .19 cubic inch would therefore allow an area of wear equivalent to more than one-half inch depth (radial) all around the shaft. Even if full efficiency of plastic flow toward the center is not realized, it is quite evident that the diaphragm will be fluid tight for a comparatively long time.

Nevertheless, at some time replacement will be required, and to facilitate this the diaphragm 18 and the porous washers 22, 23 are cut either with a single radial cut 19, 21 or in halves with a diametral cut, so that the seal parts may be put on the shaft sidewise. The spring pressure will expand the diaphragm sufficiently to close the cuts fluid tight. While no cement is required for tightness, it is found that wear is better resisted if the edges of the cuts are cemented together and this can readily be done.

Figure 3:
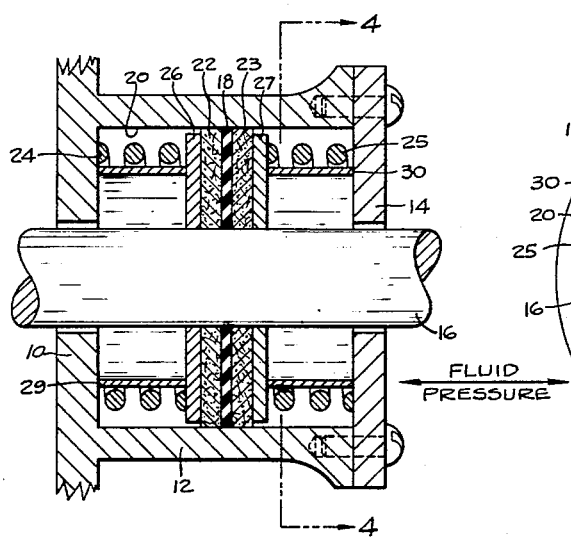
FIGURE 3 is a central vertical sectional view of another form of shaft seal embodying the present invention, and especially adapted for sealing a shaft against fluid flow in either direction longitudinally of the shaft.
Figure 4:
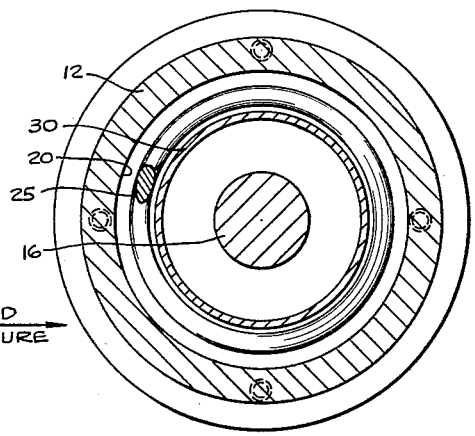
FIGURE 4 is a vertical sectional view taken on lines 4—4 of FIGURE 3.

When the seal is to resist fluid pressure from either direction, as in the case of intermittently operated centrifugal pumps, in which the pressure may at times be subatmospheric, it is best to have a spring on each side of the diaphragm. An embodiment of the invention to provide a seal against fluid pressure in either direction relative to the axis of the shaft is shown in FIGURES 3 and 4 of the drawings. In this form of the invention the rubber membrane or diaphragm 18 is backed on both sides, by felt washers 22, 23, and there are two metal washers 26 and 27 and two springs 24 and 25. The hollow cylindrical metal stops 29 and 30 are provided so that when one side of the seal is subjected to fluid pressure, the washer 26 or 27 will be pressed against the stop member 29 or 30. These stops may be loosely fitted within the springs 24 and 25. Under these conditions the spring 24 or 25 which is on the low pressure side of the diaphragm 18 will not be effective as a spring. The stops 29 and 30 are of such length that there is very little clearance between them and the washers 26 and 27 when the seal is not subjected to fluid pressure.

In the form of the invention shown in FIGURES 1 and 2, the felt disc 23 may conveniently be soaked with a lubricant to decrease the friction between it and the shaft, because there will be some tendency, when the seal assembly is subjected to fluid pressure, for the felt backing discs to be forced radially inwardly against the shaft in a manner similar to the way in which the diaphragm 18 is deformed. However, the felt washers 22 and 23 do not have the elasticity and flow characteristics of the diaphragm 18, so that very little wear on these washers will take place, but the washers will be effective to hold the diaphragm flat and in contact with the shaft and with the housing.

When the pressure fluid is a gas, both felt discs 22 and 23 may be permeated with a lubricant. If the pressure fluid is water, it will usually not be desirable to apply lubricant to the felt washer 22 or 23. It should be noted that the arrangement of the felt washers 22 and 23 at either side of the membrane 18 is of considerable aid in effecting plastic flow of the material from which the membrane is formed. This is true because the coefficient of friction between these washers and the membrane is considerably lower than that which would exist between the metal washers 26 and 27. Other slip-inducing means than felt washers may be provided between the membrane and its rigid supporting elements, as for example a plastic such as Polyethylene or Polytetrafluorethylene. Alternately, a lubricating compound in the nature of a heavy oil or grease may prove suitable in some instances.

Referring now to FIGURES 5 and 6, there is shown another form of shaft seal embodying the present invention. This shaft seal includes an impervious deformable, centrally apertured membrane or disc 18a which is made up of two different materials. The first material is highly wear-resistant while the second material exhibits excellent characteristics of plastic flow, and the best qualities of each of these materials are utilized to provide an improved form of seal. The seal is adapted for use with a housing 34 having a bore 36 wherein is disposed a rotatable or reciprocal shaft 38. The seal is arranged within a cylindrical cavity 40 that forms a coaxial continuation of the bore 36 transversely of the shaft 38. The membrane of disc 18a includes an inner or wear ring 42 formed of a highly wear-resistant material, as for example a plastic such as Polyethylene or Polytetrafluoroethylene. This inner ring 42 is encompassed by an outer ring 44 formed of material having excellent plastic flow characteristics, such as soft rubber. It is also possible to form both the inner and outer rings out of rubber, the inner ring being formed of a rubber that has been especially compounded to provide resistance to wear and abrasion, and the outer ring being formed of a rubber that has been especially compounded to readily flow plastically under pressure. The inner periphery of the inner ring 42 encompasses the outer periphery of the shaft 38 in sealing relationship, while the outer periphery of the outer ring 44 is encompassed by the walls of the cylindrical cavity 40. A pair of suitable backing members, such as washers 46 and 48 formed of felt or similar fibrous material, are disposed at either side of the disc 18a. A pair of metal washers 50 and 52 are disposed at either side of the felt washers 46 and 48. A helical compression spring 54 is interposed between the blind end of the cylindrical cavity 40 and the metal washer 50 proximate thereto. A metal snap ring serves to anchor the other metal washer 52 against axial movement under the influence of the spring 54. Thus, the spring 54 will apply a force longitudinally of the shaft tending to compress the membrane 18a and therefore cause it to expand radially outwardly and inwardly. This spring pressure will be augmented by the fluid pressure existing within the housing 34.

Relative movement between the shaft 38 and the housing 34 will tend to wear away the inner ring 42 at a rate which is lower than would be the case should the disc 18a be formed entirely of soft rubber. This is especially true where the inner ring 42 is formed of a material such as Polyethylene or Tri Fluor Polyethylene having excellent lubricating qualities. As the inner ring 42 is worn away, it is necessary for it to undergo plastic flow radially inwardly toward the shaft 38 in order to make up the wear. The plastic flow characteristics of the wear ring 42 will be enhanced considerably by the presence of the outer ring 44. This is true inasmuch as the latter tends to flow plastically more readily than the inner ring and will therefor exert a constant radially inwardly directed pressure against the outer periphery of the wear ring 42. The abutment of the outer periphery of the outer ring 44 with the wall of the cavity 40 will restrain radially outward plastic flow of such ring. The disc 18a should be capable of undergoing plastic flow radially inwardly at a minimum rate equal to that at which the inner periphery of the wear ring 42 is worn away by the shaft 38. Referring to FIGURE 6, both the wear ring 42 and the outer ring 44 may be formed with radial cuts 56 and 58, respectively, which will permit these rings to be placed on the shaft 38 from the side thereof without disassemblying the entire seal.

Referring now to FIGURE 7, there is shown another form of seal embodying the present invention. This seal is shown interposed between a plunger or piston 60 and the wall of a cylinder 62 wherein the plunger is recipro-cated. The seal includes a membrane or disc 18b having an outer or wear ring 64 formed of a highly wear-resistant material, as for example a plastic such as Polyethylene or Tri Fluor Polyethylene, and an inner ring 66 formed of a material having excellent plastic flow characteristics, such as rubber. The disc 18b is shown compressed between two annular metal plates 68 and 70 that are in turn squeezed together by a pair of cone type springs 72 and 74. The disc, plates and springs are coaxially disposed on the shank 76 of a bolt 78 which is threaded into the end of the piston rod 80. As the outer periphery of the wear ring 64 is worn away by reciprocation of the plunger 60, it will undergo radially outward plastic flow. The plastic flow characteristics of the wear ring 64 will be enhanced appreciably by virtue of the radially outward force applied to its inner periphery by the inner ring 66 as the latter undergoes plastic flow. Radially inward plastic flow of the inner ring 60 will be prevented by the abutment of its inner periphery with the bolt shank 76.

Referring now to FIGURES 8 and 9, there is shown yet another form of seal embodying the present invention. This seal is shown interposed between an inner member, such as a vane 84, and an outer member, such as a housing 86, which members are adapted to undergo relative movement. The space between the vane 84 and the housing 86 is sealed by means of a membrane or strip 18c which is disposed within a rectangular recess 88 formed in the vane 84. This strip 18c is formed of a material, such as rubber, which is readily adapted to undergo plastic flow. The strip 18c is constantly squeezed between the back 89 of the recess 88 and an elongated plate element 90 by means of a retainer spring 92. The retainer spring 92 is secured to the vane 84 by a plurality of bolts 94. As the upper edge 96 of the strip 18c is worn away by relative movement between the vane 84 and the housing 86 it will be replaced by the upward plastic flow of the material from which the strip 18c is formed. Plastic flow downwardly in the opposite direction is prevented by the abutment of the lower edge 98 of the strip with the shoulder 100 of the recess 88.

Referring now to FIGURES 10, 11 and 12, there is shown a rotary shaft seal embodying the present invention. This seal is adapted for use with a housing 102 having a vertical bore 104 wherein is disposed a rotatable shaft 106. The seal is arranged within a cylindrical cavity 108 that forms a coaxial continuation of the bore 104. It includes an impervious deformable, centrally apertured membrane or disc 18d formed of a material which will readily undergo plastic flow, such as rubber. This membrane 18d is disposed between a pair of suitable backing members, such as washers 110 and 112 formed of felt or other fibrous material. A pair of stiff metal washers or plates 114 and 116 are disposed at either side of the felt washers 110 and 112. A pair of cone type springs 118 are interposed between the blind upper end of the cavity 108 and the upper metal washer 114. A metal snap ring 120 serves to anchor the lower metal washer 116 against downward movement under the influence of the springs 118. Thus, the springs 118 will apply a force longitudinally of the shaft tending to compress the membrane 18d and therefor cause it to expand radially inwardly and outwardly. This spring pressure may be augmented by the fluid pressure existing within the housing 102.

As the shaft 106 rotates relative to the membrane 18d the inner periphery 122 thereof will be worn away. This wear will be taken up by radially inward plastic flow of the material from which the membrane is formed. This plastic flow will occur most readily when a low coefficient of friction exists between the adjoining faces of the membrane 18d and the two backing washers 110 and 112. It should be noted, however, that the drag resulting from the rotation of the shaft 106 relative to the inner periphery 122 of the membrane 18d will tend to twist the material of the membrane inwardly toward the shaft.

Such twisting action will cause the inner periphery of the membrane to grip the shaft with considerably more force than is required in order to seal the shaft. In order to restrain such twisting of the membrane the metal plates 114 and 116 are formed with radially extending grooves 124 into which the material of the membrane 18d will be forced when the seal is assembled within the cavity 108. The depth of the grooves 124 need not be very deep in order to restrain twisting of the membrane. The felt washers 110 and 112 will also conform to the shape of the grooves 124. Preferably, the grooves 124 will taper towards one another from their radially innermost portions adjacent the shaft 106. The existence of these grooves not interfere with radially inward movement of the membrane 18d as it undergoes plastic flow.

Referring now to FIGURE 13, there is shown another form of rotary shaft seal embodying the present invention. This seal is especially adapted to withstand high pressures. It is also useful in sealing fluids having poor lubricating qualities, such as gases. The seal is shown in conjunction with a housing 130 having a bore 132 wherein is disposed a rotatable shaft 134. The seal is arranged within a cylindrical cavity 136 that forms a coaxial continuation of the bore 132. It is made up of a fluid seal member, generally designated 138, and an oil seal member, generally designated 140. These two members are identical and each include an impervious deformable, centrally apertured membrane 18e disposed between a pair of felt washers 142 and 144, and a pair of metallic support elements 146 and 148. The opposed faces of these support elements are inclined at an angle relative to the longitudinal axis of the shaft 134 whereby the membranes 18e and the felt washers 142 and 144 also assume such inclination. A spacer ring 150 formed with an oil-receiving aperture 152 is interposed between the fluid seal and oil seal members. A metal snap ring 154 is locked in the open portion of the cavity 136 adjacent the oil seal member 140. A plurality of cone type springs 156 interposed between the blind end of the cavity 136 and the fluid seal member 138 constantly bias the fluid seal member, spacer ring 150 and oil seal member against the snap ring 154. Thus, the springs 156 will apply a force longitudinally of the shaft tending to compress the two membranes 18e radially inwardly and outwardly. The force exerted by the springs 156 will be augmented by the fluid pressure existing within the housing.

Assuming the pressure of the confined fluid is comparatively high, the inner periphery 157 of the membrane 18e of the fluid seal member 138 must be urged radially inwardly against the shaft with considerable force in order to effect sealing thereof. In order to provide lubrication for this membrane, oil is introduced in the space 162 between the fluid and oil seal members by means of the spacer ring aperture 152 and a complementary aligned aperture 164 formed in the housing 130. Such oil may travel along the space between the shaft 134 and the inner periphery 166 of the support element 146 of the fluid seal member 138 until it reaches a point on the shaft disposed radially of the portion of the inner periphery 157 of the membrane 18e of the fluid seal member 138 disposed most proximate to the spacer ring 150. This oil will adhere to the rotating shaft tightly enough to be carried thereby into lubricating contact with the remainder of the inner periphery 157 of the membrane. In this manner the rate of wear of this membrane may be reduced appreciably. The membrane 18e of the oil seal member 140 will restrain outward leakage of oil from the seal. As the sealing edges 157 of the membranes 18e are worn away during rotation of the shaft 134, the material from which the membranes are formed will undergo plastic flow radially inwardly. It will be apparent that, if desired, the support elements 146 and 148 may be provided with radially extending grooves as in the embodiment shown in FIGURES 10, 11 and 12.

Referring now to FIGURE 14, there is shown a metering pump, generally designated 174, which incorporates yet another seal embodying the present invention. The metering pump 174 includes a tubular barrel 176 formed with an inlet port 178 and an outlet port 180. These ports are connected to suitable valves 182 and 184, respectively, which cooperate with a piston 186 in pumping a metered charge of fluid each time the piston is reciprocated within the barrel 176. The piston 186 is reciprocated once during each revolution of a cam 188, the piston being constantly biased toward the cam by means of a helical compression spring 190. The metering chamber 192 of the barrel is sealed from the atmosphere by means of a sealing membrane or disc 18f which is interposed between the piston 186 and a plunger 194 that extends from the open end of the barrel so as to abut the cam 188.

The membrane 18f is formed of a material which will readily undergo plastic flow such as rubber. It is constantly squeezed between the proximate ends of the piston 186 and the plunger 194 whereby its outer periphery will sealingly engage the wall 196 of the barrel 176. As the outer edge of the membrane 18f worn away during reciprocation of the piston and plunger, the material from which it is formed will undergo radially outward plastic flow so as to take up the wear.

It will be apparent from the foregoing that I have discovered a completely new sealing principle which provides many advantages over conventional seals. This sealing principle makes use of the characteristics of certain materials to readily undergo plastic flow when subjected to compression. With a seal constructed in accordance with the present invention such plastic flow is utilized to automatically replace the edge thereof that is in contact with a moving surface.

It will likewise be apparent that various modifications and changes may be made with respect to the foregoing description without departing from the spirit of the invention or the scope of the following claims.

This is a continuation-in-part of application Serial No. 461,869 filed by me October 12, 1954, and entitled Diaphragm Seal, now abandoned.

I claim:

1. A seal for restraining fluid flow through a passageway formed in a first member, said passageway containing a second member and said first and second members being relatively rotatable, comprising: a impervious deformable membrane capable of plastic flow and disposed in a plane that is inclined relative to the longitudinal axis of said passageway so as to seal same; rigid elements on both sides of said membrane for supporting it in said plane; slip-inducing means having a lower coefficient of friction than that existing between said membrane and resilient said rigid elements interposed between each side of said membrane and the rigid element adjacent thereto whereby said sealing member can move laterally with low frictional resistance; and resilient for applying compressive pressure against said rigid elements in a direction extending parallel to said passageway so as to squeeze said membrane therebetween and thereby effect its plastic flow along said plane at a minimum rate equal to that at which it is worn away by its contact with the rotating member, said membrane contacting both of said first and second members thereby closing the space in the passageway between said first and second members, the cooperating faces of said membrane, said slip-inducing means and said rigid elements being of substantially the same size and shape.

2. A seal as set forth in claim 1 wherein said slip-inducing means are formed of a permeable material.

3. A seal as set forth in claim 1 wherein said slip-inducing means are formed of felt.

4. A sealing assembly comprising an apertured seal housing, an apertured cover for said housing, a shaft extending through said apertures, the housing defining an inner wall surface surrounding said shaft generally parallel thereto, said housing forming part of an enclosure for fluid under pressure, a thin flat impervious deformable elastic diaphragm capable of plastic flow apertured to receive and engage said shaft and further engaging said inner wall surface, a pair of porous slip-inducing washers adjacent said diaphragm having a low coefficient of friction, said slip-inducing washers being of substantially the same lateral surface area as said diaphragm, a spring within said housing biased to compress said diaphragm and washers longitudinally of said shaft towards the inner surface of said cover, and means interposed between said spring and one of said pair of slip-inducing washers to distribute the force of the spring generally uniformly over substantially the entire surface of the diaphragm, said means being relatively movable with respect to said cover.

5. A sealing means for sealing a space existing between two surfaces, one movable with respect to the other, comprising an impervious deformable membrane formed of a material capable of plastic flow that extends across said space and contacts both of said surfaces to seal the space, stiff elements relatively movable towards each other, one on each side of said membrane, for supporting said membrane within said space, slip-inducing means having a lower coefficient of friction than that existing between said membrane and said stiff elements interposed between said membrane and each of said stiff elements whereby said sealing membrane can move laterally with low frictional resistance, the lateral surfaces of the stiff elements, the slip-inducing means, and said membrane being generally of the same surface area, and resilient means for applying a squeezing force against said stiff elements to compress said membrane therebetween to effect its plastic flow into said space at a rate at least equal to that at which it is worn away by contact with the relatively movable surfaces.

6. A seal as set forth in claim 5 wherein said slip-inducing means are formed of a permeable material.

7. A seal as set forth in claim 5 wherein said slip-inducing means are formed of felt.

8. A seal for restraining fluid flow through a passageway formed in a first member, said passageway containing a second member and said first and second members being relatively movable, comprising: a thin impervious deformable membrane formed of a material capable of undergoing plastic flow, said membrane being disposed in a plane across said passageway and in contact with both of said members so as to seal same; stiff elements on both sides of said membrane for supporting it in said plane, said stiff elements being relatively movable towards each other; slip-inducing means having a lower coefficient of friction than that existing between said membrane and said stiff elements interposed between each face of said membrane and the stiff element adjacent thereto whereby said membrane can move laterally with low frictional resistance; and resilient means for applying force against said rigid elements in a direction extending along said passageway so as to compress said membrane therebetween, such compression tending to effect its plastic flow along said plane at a minimum rate equal to that at which it is worn away by relative movement between said first and second members, the facing surfaces of said membrane, said slip-inducing means and said rigid elements being of substantially the same dimensions.

9. The seal of claim 8 wherein said relatively movable members are relatively rotatable.

10. The seal set forth in claim 9 wherein said stiff elements include means which resist the tendency of the material of said membrane to twist.

11. A seal for restraining fluid flow through a passageway formed in a first member, said passageway containing a second member and said first and second members being relatively movable, comprising: a thin impervious deformable membrane having a first portion that is highly wear-resistant and is capable of undergoing plastic flow, and a second portion that is not as wear-resistant but which will undergo plastic flow more readily than the first portion formed of a material capable of undergoing plastic flow, said membrane being disposed in a plane across said passageway, the first portion being in contact with the one member and the second portion being in contact with the other member to provide a seal between the members, stiff elements on both sides of said membrane for supporting it in said plane, said stiff elements being relatively movable towards each other; slip-inducing means having a lower coefficient of friction than that existing between said membrane and said stiff elements interposed between each face of said membrane and the stiff element adjacent thereto whereby said membrane can move laterally with low frictional resistance; and resilient means for applying force against said rigid elements in a direction extending along said passageway so as to compress said membrane therebetween, such compression tending to effect its plastic flow along said plane at a minimum rate equal to that at which it is worn away by relative movement between said first and second members, the facing surfaces of said membrane, said slip-inducing means and said rigid elements being of substantially the same dimensions.

12. A shaft seal assembly for sealing against flow of a fluid in either direction along the surface of a shaft, means forming a cylindrical housing around the shaft; a sealing member comprising a thin, impervious, deformable, elastic diaphragm having its outer edge shaped to engage the inner surface of the generally cylindrical wall of the housing and perforated to provide an inner edge for engagement with a shaft, a pair of slip inducing washers having a low coefficient of friction and of felt-like material whereby said sealing member can move laterally with low frictional resistance, one on each side of the diaphragm and engaging the latter throughout the respective sides thereof, stiff metallic washers at each side of the assembly comprising the diaphragm and felt washers, a pair of springs, one at each side of the assembly including the metal washers, said spring being biased to compress the diaphragm in a direction axially of the shaft and thereby tending to cause the diaphragm to expand radially inwardly and outwardly, and means to limit the extent of movement of the seal assembly in opposite directions along the axis of the cylindrical housing.

References Cited in the file of this patent

UNITED STATES PATENTS

| | | |
|---|---|---|
| 1,561,838 | Dunham | Nov. 17, 1925 |
| 2,107,974 | Bechereau et al. | Feb. 8, 1938 |
| 2,232,293 | Toennies | Feb. 18, 1941 |
| 2,399,550 | Klein | Apr. 30, 1946 |
| 2,570,098 | Carlstedt | Oct. 2, 1951 |
| 2,687,908 | Vorech | Aug. 31, 1954 |

FOREIGN PATENTS

| | | |
|---|---|---|
| 17,214 | Australia | Mar. 20, 1935 |

UNITED STATES PATENT OFFICE
CERTIFICATE OF CORRECTION

Patent No. 3,039,780                                June 19, 1962

Carl H. Nordell

It is hereby certified that error appears in the above numbered patent requiring correction and that the said Letters Patent should read as corrected below.

Column 1, line 15, for "varities" read -- varieties --; line 19, for "replaced" read -- placed -- same column 1, line 35, for "longitudially" read -- longitudinally --; column 7, line 13, after "grooves" insert -- does --; column 8, line 21, after "18f" insert -- is --; line 45, for "a" read -- an --; line 52, strike out "resilient"; same column 8, line 55, after "resilient" insert -- means --.

Signed and sealed this 19th day of March 1963.

(SEAL)
Attest:

ESTON G. JOHNSON                                    DAVID L. LADD
Attesting Officer                                        Commissioner of Patents